United States Patent
Haugland et al.

(10) Patent No.: US 6,584,407 B2
(45) Date of Patent: Jun. 24, 2003

(54) FORMATION RESISTIVITY MEASUREMENT METHOD THAT ELIMINATES EFFECTS OF LATERAL TOOL MOTION

(75) Inventors: Samuel M. Haugland, Houston, TX (US); Teruhiko Hagiwara, Houston, TX (US); Martin Paulk, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 162 days.

(21) Appl. No.: 09/757,969

(22) Filed: Jan. 10, 2001

(65) Prior Publication Data

US 2002/0117299 A1 Aug. 29, 2002

(51) Int. Cl.[7] ............................................. G01V 1/40
(52) U.S. Cl. ........................... 702/7; 703/10; 175/45
(58) Field of Search ........................... 702/7, 6, 12, 14; 367/25, 69; 324/303; 703/5, 10, 15, 18, 110; 175/45

(56) References Cited

U.S. PATENT DOCUMENTS

| | | | | |
|---|---|---|---|---|
| 4,803,667 A | | 2/1989 | Siegfried, II | 367/69 |
| 5,899,958 A | * | 5/1999 | Dowell et al. | 702/6 |
| 5,987,385 A | * | 11/1999 | Varsamis et al. | 702/6 |
| 6,038,513 A | * | 3/2000 | Varsamis et al. | 702/6 |
| 6,366,858 B1 | * | 4/2002 | Haugland | 702/7 |
| 6,381,542 B1 | * | 4/2002 | Zhang et al. | 702/7 |
| 6,400,148 B1 | * | 6/2002 | Meyer et al. | 324/303 |

FOREIGN PATENT DOCUMENTS

| | | | |
|---|---|---|---|
| EP | 0 556 114 | 8/1993 | G01V/3/24 |
| EP | 0 646 697 | 4/1995 | E21B/17/00 |
| GB | 2 156 984 | 10/1985 | G01V/1/40 |
| GB | 2 249 170 | 4/1992 | G01V/5/04 |

* cited by examiner

Primary Examiner—Edward Lefkowitz
Assistant Examiner—Victor J. Taylor
(74) Attorney, Agent, or Firm—Conley Rose, P.C.

(57) ABSTRACT

A method of compensating for tool motion is disclosed. In one embodiment, the method includes passing a logging tool through a borehole, obtaining a series of tool response measurements, and obtaining a series of tool position measurements associated with the tool response measurements. The tool position measurements preferably indicate the distance between the tool axis and the borehole axis. The tool position measurements are preferably examined to determine if the tool was moving while the tool was making measurements. For measurements made while the tool was moving, the measurement time interval is preferably divided into subintervals each having a corresponding tool position. A formation property (such as resistivity) is estimated, and the expected tool response for each tool position is calculated. The expected tool responses are combined to form a model tool response, that is, the tool response that might be expected for a tool in motion. The model tool response is then compared to the measured tool response. The estimate of the formation property is adjusted and the process is repeated until the model tool response is substantially equal to the measured tool response.

17 Claims, 2 Drawing Sheets

FORMATION RESISTIVITY MEASUREMENT METHOD THAT ELIMINATES EFFECTS OF LATERAL TOOL MOTION

FIELD OF THE INVENTION

The present invention relates generally to method of processing downhole property measurements. More particularly, the present invention relates to a method for eliminating the effects of lateral tool motion on formation resistivity measurements and other downhole measurements.

BACKGROUND OF THE INVENTION

Modern petroleum drilling and production operations demand a great quantity of information relating to the parameters and conditions downhole. Such information typically includes the location and orientation of the well bore and drilling assembly, earth formation properties, and drilling environment parameters downhole. The collection of information relating to formation properties and conditions downhole is commonly referred to as "logging", and can be performed by several methods.

In conventional wireline logging, a probe or "sonde" having various sensors is lowered into the borehole after some or all of the well has been drilled. The sonde is typically constructed as a hermetically sealed, steel cylinder for housing the sensors, and is typically suspended from the end of a long cable or "wireline". The wireline mechanically suspends the sonde and also provides electrical conductors between the sensors and electrical equipment located at the surface of the well. Normally, the cable carries power and control signals to the sonde, and carries information signals from the sonde to the surface. In accordance with conventional techniques, various parameters of the earth's formations adjacent the borehole are measured and correlated with the position of the sonde in the borehole as the sonde is pulled uphole.

An alternative to wireline logging entails the collection of data during the drilling process itself. Designs for measuring conditions downhole along with the movement and location of the drilling assembly, contemporaneously with the drilling of the well, have come to be known as "measurement-while drilling" techniques, or "MWD". Similar techniques, concentrating more on the measurement of formation parameters, have commonly been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The sensors used in a wireline sonde or a bottom hole assembly may include a source device for transmitting energy into the formation, and one or more receivers for detecting the energy reflected from the formation. Various sensing tools have been used to determine particular characteristics of the formation, including nuclear sensors, acoustic sensors, and electrical sensors.

For an underground formation to contain petroleum, and for the formation to permit the petroleum to flow through it, the rock comprising the formation must have certain well known physical characteristics. For example, one characteristic is that the rock in the formation have space to store petroleum. If the rock in a formation has openings, voids, and spaces in which oil and gas may be stored, it is characterized as "porous". Thus, by determining if the rock is porous, one skilled in the art can determine whether or not the formation has the requisite physical properties to store and yield petroleum. Various well known sensors may be used to measure formation porosity.

Once the porosity has been determined, other sensors are used to identify the fluids held by the porous rock formations. One property that may be used to distinguish between liquid petroleum and brine in a formation is the formation resistivity. Porous formations having a low resistivity are likely to contain brine, whereas formations that contain petroleum are likely to have a high resistivity. In a type of formation called "shaley-sand," for example, the shale bed can have a resistivity of about 1 ohm-meter. A bed of oil-saturated sandstone, on the other hand, is likely to have a higher resistivity of about 10 ohm-meters or more. The sudden change in resistivity at the boundary between beds of shale and sandstone can be used to locate these boundaries. Various tools well known to those of skill in the art may be used to acquire the resistivity measurements. Examples of suitable tools include galvanic tools, induction tools, and other tools that measure resistivity.

Induction tools typically include a sonde having a transmitter coil and one or more receiver coils at locations axially spaced from the transmitter coil. The basic element in all multi-coil induction tools is the two-coil sonde. The two-coil sonde consists of a single transmitter coil and a single receiver coil wrapped around an insulating mandrel. The transmitter coil is driven by an oscillating current at a frequency of a between few tens of kilohertz and a few megahertz. The resulting magnetic field induces eddy currents in the formation which are coaxial with the tool. These eddy currents cause a secondary magnetic field which in turn induces a voltage in the receiver coil. This induced voltage is then amplified, and the component of the voltage that is in-phase with the transmitter current is measured and multiplied by a tool constant to yield an apparent conductivity signal. This apparent conductivity is then recorded at the surface as a function of the depth of the tool.

Induction tools (as well as galvanic resistivity tools) commonly measure the resistivity in a concentric volume around the tool. Experts generally speak of this volume as having an average radius which is called the "depth of investigation" or "radius of investigation." In addition to the formation resistivity, the response of induction tools (as well as other resistivity measurement tools) is a function of several factors including the borehole geometry, the borehole fluids, and the position of the tool in the borehole. The response of the tool is therefore a multivariable function which can be calculated using a mathematical model, or alternatively, which can be empirically measured during a calibration process. A competent computer programmer can normally write a computer routine that will calculate the expected tool response after receiving the various factors. However, because the expected tool response is only rarely a closed-form equation which can be solved for the formation resistivity, writing a program that calculates the formation resistivity after receiving the actual tool response and various other factors presents some difficulty. This difficulty is aggravated if the tool response was measured while one or more of the factors is changing.

SUMMARY OF THE INVENTION

The problems described above are in large part solved by a method of compensating for tool motion. In one embodiment, the method includes passing a logging tool through a borehole, obtaining a series of tool response measurements, and obtaining a series of tool position measurements associated with the tool response measurements. The tool position measurements preferably indicate the distance between the tool axis and the borehole axis. The tool position measurements are preferably examined to determine if the tool was moving while the tool was making measurements. For measurements made while the tool was moving, the measurement time interval is preferably divided into subintervals each having a corresponding tool position. A formation property (such as resistivity) is estimated, and the expected tool response for each tool position is calculated. The expected tool responses are combined to form a model tool response, that is, the tool response that might be expected for a tool in motion. The model tool response is then compared to the measured tool response. The estimate of the formation property is adjusted and the process is repeated until the model tool response is substantially equal to the measured tool response.

BRIEF DESCRIPTION OF THE DRAWINGS

A better understanding of the present invention can be obtained when the following detailed description of preferred embodiments is considered in conjunction with the following drawings, in which.

DETAILED DESCRIPTION OF THE PREFERRED EMBODIMENTS

Figure 1:
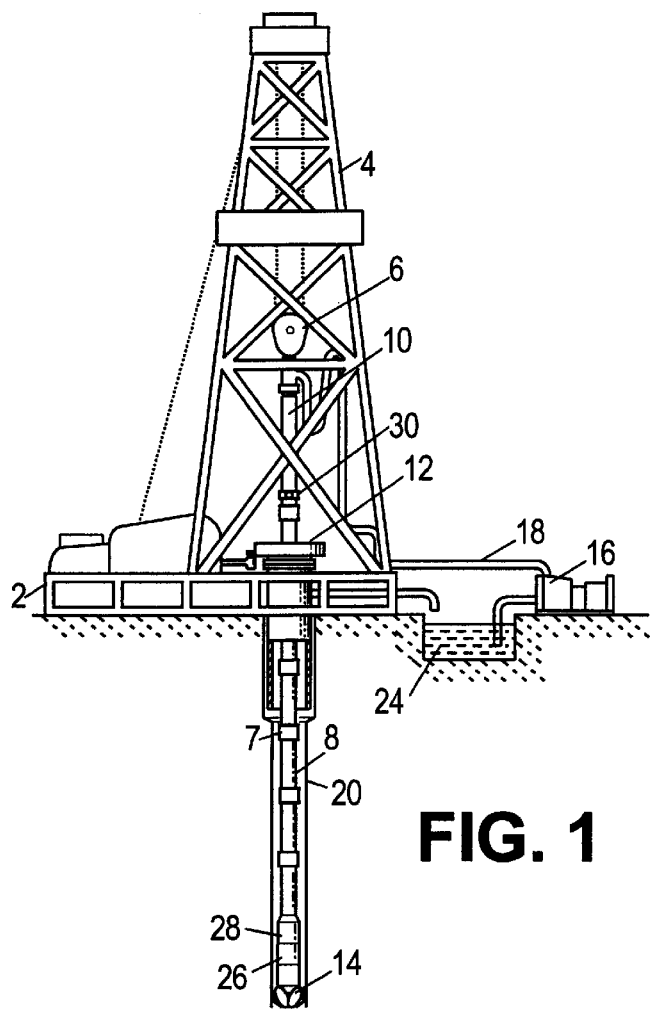
FIG. 1 shows an environmental view of a well in which a resistivity tool according to the present invention may be used.

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods.

Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

In a preferred embodiment, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques are well known and may be used.

Figure 2:
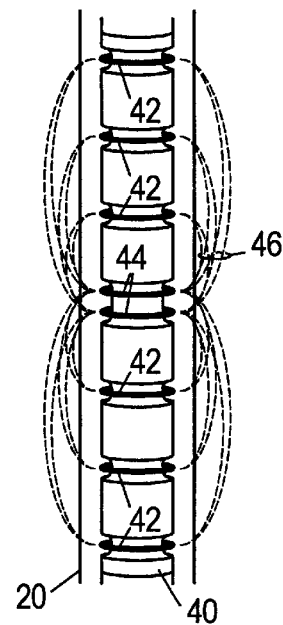
FIG. 2 shows a LWD resistivity tool having multiple volumes of investigation.

The sensors 26 preferably include a resistivity tool having multiple depths of investigation. An example of one such resistivity tool is shown in FIG. 2. Resistivity tool 40 has a series of transmitters 42 and a pair of receivers 44. When one of the transmitters 42 is excited by an oscillatory signal, it generates an electromagnetic wave that propagates into the formation. The receiver pair 44 detects the electromagnetic wave as modified by the formation. The attenuation and phase difference between the receivers may be used to identify the average resistivity in a volume around the borehole 20 having an average depth of investigation 46 determined by the transmitter/receiver-pair spacing.

The resistivity tool 40 operates in a borehole and is accordingly surrounded by drilling mud that likely has a resistivity different than that of the formation. Since resistivity tool 40 has three transmitter/receiver-pair spacings, the resistivity for at least three depths of investigation may be measured. The multiple depths of investigation allow the resistivity of the mud to be measured and compensated. The shallower depth resistivity measurements are used to compensate the deeper depth resistivity measurements, so that a more accurate estimate of the undisturbed formation resistivity may be obtained.

Figure 3:
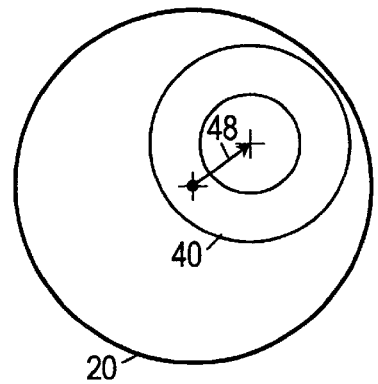
FIG. 3 shows an overhead view of a resistivity tool displaced from the center of a borehole.

Azimuthally symmetric sensors such as resistivity tool 40 make measurements that do not depend on the rotational orientation of the tool. However, the measurements do depend on the position of the tool in the borehole. FIG. 3 shows a cross-sectional end view of the tool 40 in a borehole 20. During normal drilling activities, the center of the tool will be displaced from the center of the borehole by a displacement vector 48 that changes as a function of time. At a given depth along the length of the borehole, the measured signals will depend on the resistivity distribution in the earth formation, the resistivity of the fluid within the borehole, the diameter of the borehole, and the magnitude of the displacement vector. The measurements will vary as the displacement vector's magnitude, P(t), varies. This variation is particularly acute when the resistivity of the borehole fluid contrasts sharply with the resistivity of the formation. The magnitude of the displacement vector is hereafter termed position P(t).

The tool is preferably in the center of the borehole, but this is generally infeasible. However, the borehole diameter and the position of the tool in the borehole can be measured, and this information used to compensate the measurement variation. Various techniques may be used to measure the borehole diameter and the position P(t), including focused ultrasonic transducers as disclosed in a co-pending application. Various well known methods also exist for measuring the resistivity of the borehole fluid.

Measurements of the borehole fluid resistivity, borehole diameter, position P(t), and the tool response $S_{meas}$, are communicated by telemetry from transmitter 28 to receiver 30. The tool response is hereby defined to be the measurements made by the tool. These measurements may be the elemental signal measurements such as the signal attenuation and phase shift. They may be processed measurements such as temperature-compensated attenuation and phase shift measurements. They may even be calculated measurements such as apparent resistivity. The tool response is determined by the design of the tool, but clearly it should be in some way indicative of the formation property that the tool is designed to measure.

The receiver 30 communicates the telemetry to a surface installation (not specifically shown) that processes and stores the measurements. The surface installation typically includes a computer system of some kind, e.g. a desktop computer such as that shown in FIG. 4.

Figure 4:
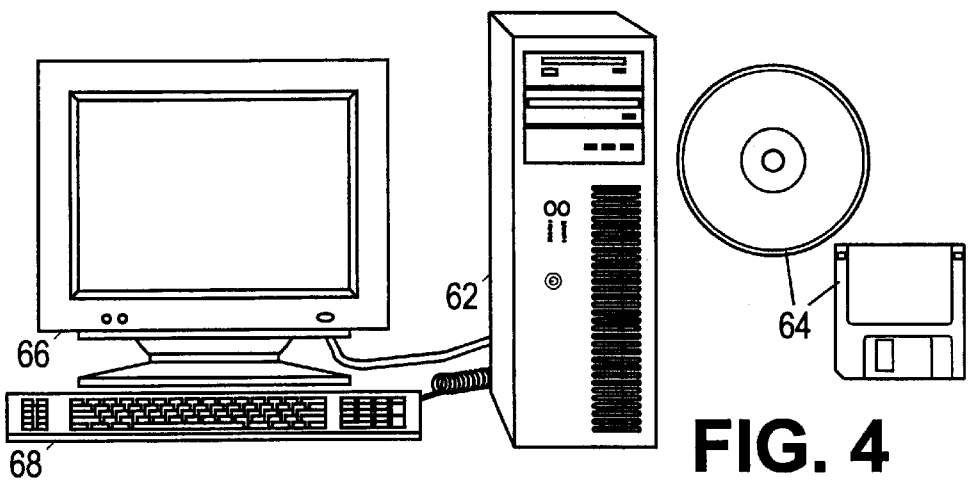
FIG. 4 shows a computer system that will support execution of a resistivity profile determination method.

The system of FIG. 4 includes a computer "tower" 62, a display device 66, and a user input device 68. The computer tower 62 houses a power supply, a processor, short and long term data storage, and input/output connectors for peripheral devices. Typically, the computer tower 62 also includes one or more types of readers for portable information storage media 64.

A user initiates via user input device 68 retrieval and execution of software that implements the measurement processing method disclosed herein. The processor in computer tower 62 retrieves the compensation method from the internal storage media or the portable storage media 64, converts it to executable form if necessary, and executes it. The processing method would be embedded in a larger software module that specifies where the measured data is found, and specifies where the processed results are to be stored. Most such software modules will also provide feedback to the user via display device 66. It is noted that the compensation method can also be performed in hardware or firmware as an application-specific integrated circuit (ASIC).

Figure 5:
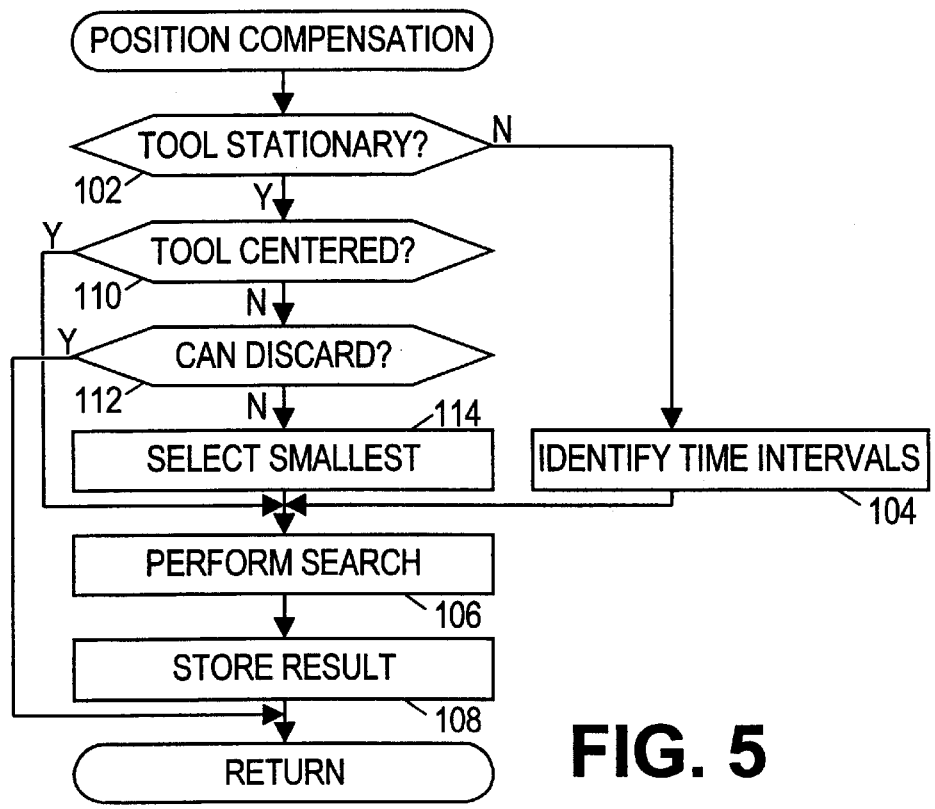
FIG. 5 shows a flowchart of a method for compensating lateral displacement.

The system of FIG. 4 implements the method shown in FIG. 5. The method is shown in the form of a subroutine that receives the measured borehole fluid resistivity, borehole diameter, position P(t), and the tool response $S_{meas}$. The subroutine then performs operations which determine the formation resistivity $R_f$ while eliminating the effects of position variation.

Each measurement of the tool response takes a finite amount of time T. In block 102, the computer tests to see if the position P(t) changed appreciably during the measurement of the tool response $S_{meas}$. This may be done by comparing the difference between the maximum and minimum values of the position measurement during the measurement interval, to a threshold value. If the difference exceeds the threshold, the tool is moving during the measurement. Alternatively, the derivative of the position P(t) during the response measurement may be estimated (e.g. by a least-squares curve fit to the position measurements), and if the magnitude of the derivative exceeds the threshold, the tool is moving.

If the tool is moving, then in block 104, the duration of the response measurement is divided into time intervals. This may be done in a variety of ways. In one embodiment, the duration is simply divided into a predetermined number of uniform time intervals. In an alternative embodiment, there are a number of discrete position measurements during the tool response measurement, an in block 104 one time interval is created for each position measurement. In yet another alternative embodiment, the number and size of the time intervals is determined in accordance with the derivative of the position measurement. Where the derivative is large, the size of the time intervals is decreased and the number proportionately increased. The size of the time intervals may be selected to prevent the change in position between intervals from exceeding a predetermined threshold.

Once the time intervals have been identified, a search is performed in block 106 over a range of formation resistivities $R_f$ to determine the resistivity that corresponds to the measured tool response $S_{meas}$. The tool response is modeled as:

$$S_{mod}(R_f) = \frac{1}{T}\sum_{i=1}^{n} S_{exp}(P(t_i), R_f)\Delta t_i, \quad \text{Eqn. 1}$$

where $S_{exp}$ is the tool response function (the dependency on drilling fluid resistivity and borehole geometry has been omitted), and $\Delta t_i$, i=1 . . . n, are the time intervals identified in block 104. In a preferred embodiment, the time intervals are a uniform $\Delta t$, so $t_i = i\Delta t$.

The tool response function $S_{exp}$ is predetermined by mathematical modeling or empirical measurements. A separate subroutine exists for determining $S_{exp}$ for the measured values of position, drilling fluid resistivity, and borehole geometry when an estimated formation resistivity $R_f$ is provided. In block 106, that subroutine is used to calculate the tool response function $S_{exp}$ for a variety of estimated formation resistivities $R_f$ at each of the positions $P(t_i)$. The search continues until the modeled tool response $S_{mod}(R_f)$ matches the measured tool response $S_{meas}$ to within some predetermined tolerance.

The search may be performed in a variety of ways. There are well known numerical algorithms for minimization which could be used to find the formation resistivity that minimizes the difference between the modeled tool response $S_{mod}(R_f)$ and the measured tool response $S_{meas}$. These include systematic approaches, statistical (random) approaches, exhaustive approaches, and combinations thereof. Any one of these may be employed in block 106. Many of these algorithms are taught in William H. Press, Saul A. Teukolsky, William T. Vetterling, and Brian P. Flannery, *Numerical Recipes in C: The Art of Scientific Computing*, $2^{nd}$ edition published January 1993 by Cambridge University Press; ISBN: 0521431085.

The result of the search is a formation resistivity value $R_f$ that accounts for measurement variation induced by positional variation of the tool in the borehole. This result is stored in block 108, and the subroutine is exited. The subroutine of FIG. 5 is repeated for each tool response measurement.

Returning to block 102, if the tool is not moving in the borehole (i.e. it is stationary), then the computer tests the position measurement P(t) in block 110 to determine if the tool is centered. This may involve determining if the position measurement P(t) is less than a threshold value. If so, the search in block 106 is performed with only a single time interval, i.e. n=1.

If the tool is not centered, then in block 112, the computer examines the resistivity log (the stored formation resistivities) to determine if the current resistivity measurement can be discarded. Because resistivity measurements made by a decentered tool tend to be less accurate, it may be preferable to drop the measurement when the tool is decentered. However, this could conceivably result in large intervals of the borehole for which no resistivity measurement is kept.

To avoid this undesirable result, tool response measurements made by a decentered resistivity tool are not always discarded. If over a predetermined interval, all the response measurements are made when the tool is decentered, the tool measurement in that interval with the smallest decentering (smallest P(t)) will be retained. The selection from the current and previous discarded response measurements in the interval is made in block 114. The search in block 106 is then performed using a single time interval (i.e. with n=1).

After the subroutine of FIG. 5 has been applied to the sequence of downhole measurements, the result is a formation resistivity log. This is not necessarily the final result. Further processing may be employed. For example, the resistivity tool may have multiple depths of investigation. In that case, further processing might be used to combined the logs from each depth of investigation to reduce the effects of formation invasion.

Numerous variations and modifications will become apparent to those skilled in the art once the above disclosure is fully appreciated. The disclosed technique may be applied to induction tools, galvanic tools, and other tools that measure formation resistivity. Further, the present invention is not limited to resistivity, but may alternatively be applied to the interpretation of other downhole property measurements. It is intended that the following claims be interpreted to embrace all such variations and modifications.

We claim:

1. A method of logging a formation property, wherein the method comprises:

passing a logging tool through a borehole;

obtaining a series of tool response measurements; and obtaining a series of tool position measurements associated with the series of tool response measurements, wherein the tool position measurements are indicative of a distance between a tool axis and a borehole axis, wherein for each tool response measurement, the method further comprises processing tool position measurements associated with the tool response measurement to determine if the logging tool was stationary while the tool response measurement was made.

2. The method of claim 1, wherein the processing includes:

determining a maximum tool position measurement associated with the tool response measurement;

determining a minimum tool position measurement associated with the tool response measurement; and comparing a difference between the maximum and minimum tool position measurements to a predetermined threshold, wherein the tool is determined to be stationary if the difference is less than the predetermined threshold.

3. The method of claim 1, wherein the processing includes:

determining a time derivative of the tool position; and comparing the time derivative of the tool position to a predetermined threshold, wherein the tool is determined to be stationary if the derivative is less than the predetermined threshold.

4. The method of claim 1, further comprising:

for each tool response measurement while the logging tool was not stationary, dividing a measurement time interval associated with the tool response measurement into subintervals having a corresponding tool position determined from the tool position measurements;

performing a search using a plurality of formation property values, wherein for each formation property value, the search includes:

determining an expected tool response for each subinterval;

averaging the expected tool responses to determine a model tool response; and determining if the model tool response differs from the tool response measurement by less than a predetermined tolerance.

5. The method of claim 4, wherein the dividing includes dividing the measurement time interval into a number of subintervals, wherein the number of subintervals is equal to a number of tool position measurements associated with the tool response measurement.

6. The method of claim 4, wherein the dividing includes dividing the measurement time interval into a predetermined number of subintervals.

7. The method of claim 4, wherein the dividing includes dividing the measurement time interval into a number of subintervals that is determined in response to a time derivative of the tool position.

8. The method of claim 4, further comprising:

after performing the search, storing the formation property value that causes the model tool response to differ from the tool response measurement by less than the predetermined tolerance.

9. The method of claim 8, wherein the formation property corresponds to electrical resistivity.

10. The method of claim 1, further comprising:

for one or more tool response measurements while the logging tool was stationary:

performing a search using a plurality of formation property values, wherein for each formation property value, the search includes:

determining an expected tool response; and determining if the expected tool response differs from the tool response measurement by less than a predetermined tolerance.

11. The method of claim 1, further comprising:

for each tool response measurement while the logging tool was stationary:

comparing the tool position measurement to a predetermined limit; and if the tool position measurement is less than the predetermined limit, performing a search using a plurality of formation property values, wherein for each formation property value, the search includes:

determining an expected tool response; and determining if the expected tool response differs from the tool response measurement by less than a predetermined tolerance.

12. The method of claim 1, further comprising:

for each tool response measurement while the logging tool was stationary:

comparing the tool position measurement to a predetermined limit; and if the tool position measurement is greater than the predetermined limit, determining whether all the tool position measurements in an interval exceed the predetermined limit, and if so:

selecting a tool response measurement having a smallest tool position measurement in the interval;

performing a search using a plurality of formation property values, wherein for each formation property value, the search includes:

determining an expected tool response; and determining if the expected tool response differs from the tool response measurement by less than a predetermined tolerance.

13. A method of compensating measurement values for motion of the measurement tool, wherein the method comprises:

using the measurement tool to determine a measurement value;

measuring the positions of the measurement tool while the measurement tool is determining the measurement value; and determining a property value that produces a model value substantially equal to the measurement value, wherein the model value is a weighted sum of experimental values, wherein the experimental values are each calculated using a tool response function that depends on a tool position, and wherein the tool positions used to calculate the experimental values are determined from position measurements.

14. The method of claim 13, wherein the weighted sum is a straight average, wherein the tool positions are determined by dividing a measurement interval into a predetermined number of equal subintervals for which tool positions are calculated from position measurements.

15. The method of claim 13, wherein the tool response function also depends on estimated property values, and wherein said determining includes repeatedly determining estimated property values until one is found that causes the model value to substantially equal the measurement value.

16. The method of claim 13, wherein the property value is a formation resistivity.

17. The method of claim 13, wherein said measuring the positions of the measurement tool includes determining a distance between a tool axis and a borehole axis.

* * * * *